(12) United States Patent
Evans

(10) Patent No.: US 8,358,268 B2
(45) Date of Patent: Jan. 22, 2013

(54) MULTI-TOUCH DETECTION

(75) Inventor: David Evans, Los Altos Hills, CA (US)

(73) Assignee: Cisco Technology, Inc., San Jose, CA (US)

( * ) Notice: Subject to any disclaimer, the term of this patent is extended or adjusted under 35 U.S.C. 154(b) by 1217 days.

(21) Appl. No.: 12/178,415

(22) Filed: Jul. 23, 2008

(65) Prior Publication Data

US 2010/0019972 A1    Jan. 28, 2010

(51) Int. Cl.
*G09G 5/00* (2006.01)
(52) U.S. Cl. ......................... 345/156; 345/173
(58) Field of Classification Search .......... 345/156–158, 345/173–178
See application file for complete search history.

(56) References Cited

U.S. PATENT DOCUMENTS

| | | | |
|---|---|---|---|
| 6,498,590 B1 | 12/2002 | Dietz et al. | |
| 2002/0075240 A1* | 6/2002 | Lieberman et al. | 345/170 |
| 2004/0169638 A1* | 9/2004 | Kaplan | 345/156 |
| 2005/0264527 A1* | 12/2005 | Lin | 345/156 |
| 2006/0244720 A1* | 11/2006 | Tracy | 345/156 |
| 2006/0293793 A1* | 12/2006 | Tamura | 700/248 |
| 2007/0257891 A1 | 11/2007 | Esenther et al. | |
| 2008/0129704 A1 | 6/2008 | Pryor | |
| 2008/0143682 A1* | 6/2008 | Shim et al. | 345/173 |
| 2010/0019972 A1 | 1/2010 | Evans | |

\* cited by examiner

*Primary Examiner* — Jimmy H Nguyen
(74) *Attorney, Agent, or Firm* — Brinks Hofer Gilson & Lione

(57) ABSTRACT

A multi-touch system is provided. The multi-touch system includes a multi-touch detection area generated by a mobile device and a first communication device, the mobile device and first or second communication device being movable relative to each other. The mobile device is operable to determine a first set of coordinates for a first detectable object within the multi-touch detection area as a function of: a distance between the mobile device and the first communication device, a distance between the mobile device and first detectable object, and a distance between the first communication device and first detectable object.

8 Claims, 3 Drawing Sheets

MULTI-TOUCH DETECTION

BACKGROUND

The present embodiments relate to multi-touch detection. Multi-touch detection is used to recognize multiple points within a multi-touch detection area. The multi-touch detection area may be a touch screen, whiteboard, overlay glass, table, or wall. The mobility of the multi-touch detection area is restricted by the size, weight, and shape of the multi-touch detection area.

DETAILED DESCRIPTION

Figure 1:
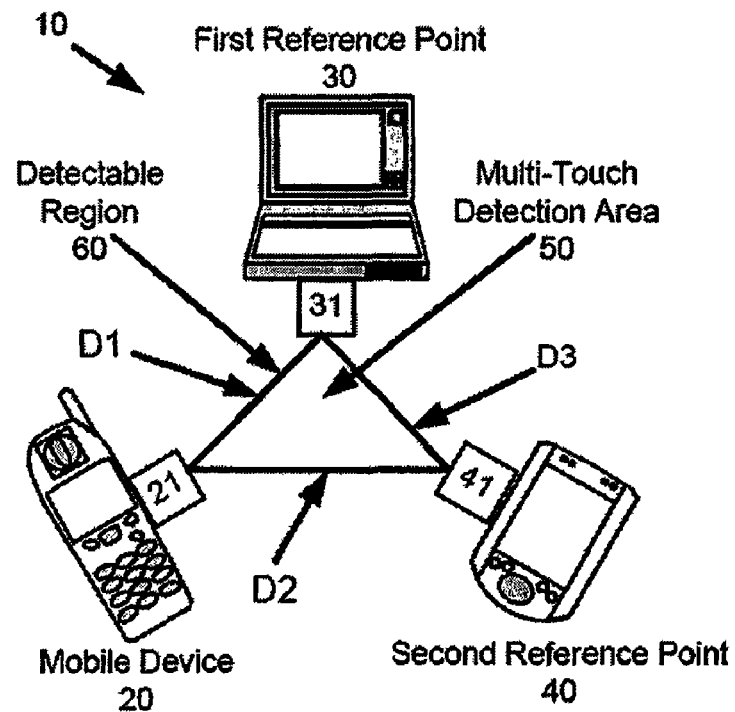
FIG. 1 illustrates one embodiment of a multi-touch system.

The present embodiments relate to a multi-touch detection system. A multi-touch detection system may include a mobile device that determines the coordinates of multiple objects within a multi-touch detection area. The multi-touch detection area may be generated using the mobile device and at least two communication devices. Using the distances between the mobile device and a communication device, the mobile device may use triangulation to determine the coordinates of one or more objects disposed in the multi-touch detection area.

In a first aspect, a multi-touch system includes a multi-touch detection area generated by a mobile device and a first communication device, the mobile device and first or second communication device being movable relative to each other. The mobile device is operable to determine a first set of coordinates for a first detectable object within the multi-touch detection area as a function of: a distance between the mobile device and the first communication device, a distance between the mobile device and first detectable object, and a distance between the first communication device and first detectable object.

In a second aspect, a method for multi-touch detection is provided. The method includes determining distances from a mobile device to first and second communication devices; determining a distance from the first communication device to the second communication device; determining a distance from a first detectable object disposed in a multi-touch detection area to at least two of the mobile device, first communication device, or second communication device; and determining a first set of coordinates of a first detectable object disposed in the multi-touch detection area using a triangulation process that is based on three or more of the determined distances.

In a third aspect, a machine readable medium comprising machine executable instructions is provided. The instructions including determination instructions that determine a distance from a mobile device to a first communication device and second communication device; receiving instructions that receive distance information including distance measurements from the first and/or second communication devices; determination instructions that determine a distance from a first detectable object disposed in a multi-touch detection area to the mobile device, first communication device or second communication device; and calculation instructions that calculate a first set of coordinates for the first detectable object as a function of a distance between the mobile device, first communication device, second communication device, or a combination thereof, and a distance between the detectable object and the mobile device, first communication device, second communication device, or a combination thereof.

In one example, a small group of people sit down at a table and place their cell phones on a table. The cell phones may be placed a few inches or a few feet apart. The cell phone may be placed in a triangle shape, with the cell phones at the apexes of the triangle. The cell phones pair with one another using an automatic pairing protocol. The cell phones include distance measuring devices for measuring the distance between the cell phones and from the cell phones to a detectable object. The distances between the cell phones are calibrated. Once calibrated, one or more detectable objects, such as a user's finger, may be detected. The coordinates of the detectable object may be used to control an application. Accordingly, the area between the cell phones may be used to simulate a multi-touch detection area.

FIG. 1 shows a multi-touch detection system 10. The system 10 includes a mobile device 20, a first communication device 30, and a second communication device 40. Additional, different, or fewer components may be provided. For example, additional communication devices may be provided.

Figure 2:
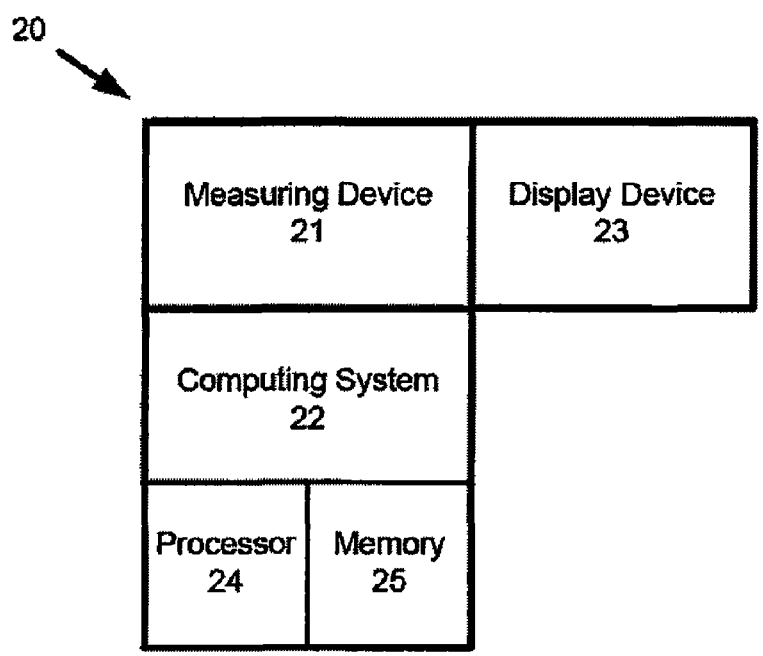
FIG. 2 illustrates one embodiment of a mobile device for generating a multi-touch detection area.

The system 10 is a network, workstation, personal computer, or other system for multi-touch detection. The system 10 may detect and process multiple objects in a detection area. For example, the system 10 provides automated assistance multi-touch computing. The system 10 provides human-computer interaction for multi-touch control. The system 10 recognizes multiple detectable objects simultaneously disposed in a multi-touch detection area. Based on the detectable objects, the system 10 may control a display device 23 (FIG. 2). For example, multiple detectable objects may be used to zoom, rotate, move, or manipulate displayed images. In another example, the detectable objects may be used for basic control, such as selecting.

A detectable object A, B, C may include detection material. The detectable object A, B, C may be a touch point, finger, drinking glass, stylus, pointer, hand, reflective pad, global positioning (GPS) endpoint, or any now known or later developed object that may be detected. The detectable object A, B, C is used to determine a distance from a point to the detectable object, so should be recognizable to the measuring device that is measuring the distance. The detectable objects used within the multi-touch detection system 10 may be the same, different, or a combination thereof. For example, a detectable object A may be an index finger on the left hand of a user; a detectable object B may be the index finger on the right hand of a user; and a detectable object C may be a drinking glass.

The communication devices 30, 40 may include a measuring device. Additional, different, or fewer components may be provided. For example, the first and second communication devices 30, 40 may include a processor, a memory, an input device, a display device, or any combination thereof. In another example, the communication devices 30, 40 do not include a measuring device.

The communication devices 30, 40 are cellular telephones, personal digital assistants (PDA), laptop computers, personal computers, network nodes, network endpoints, wall sensor, any combination thereof, or any now known or later developed communication device. For example, as shown in FIG. 1, the first communication device 30 may be a laptop computer, and the second communication device 40 may be a PDA. In another example, the first and second communication devices 30, 40 are reference points for the mobile device 20. The communication devices 30, 40 may be detected by the mobile device 20.

The communication devices 30, 40 may be mobile devices or stationary devices. For example, the communication device 30 may be embedded in a table, wall, or ground. The communication device 30 may be a wall sensor. Alternatively, the first and second communication devices 30, 40 may be moved from position to position.

The communication devices 30, 40 may include measuring devices 31, 41. The measuring devices 31, 41 are infrared transceivers, ultrasonic transceivers, sensor bars, arrays of sensors, positioning systems, any combination thereof, or other now known or later developed device for measuring a distance or location. The measuring devices 31, 41 may be attached to, embedded in, or in communication with the first and second communication devices 30, 40. The measuring devices 31, 41 measure distance or location. For example, an infrared transceiver may emit infrared light and receive reflected infrared light. The time from emission to reception may be used to calculate the distance from the measuring device 21 to the communication device 30, 40. In another example, ultrasonic waves are used. In another example, a GPS device may determine location from which distance between two devices, objects, reference points, or communication devices may be determined.

The measuring devices 31, 41 may measure a distance between the communication devices 30, 40, a distance from the communication devices 30, 40 to the mobile device 20, and/or a distance to one or more detectable objects. For example, the measuring device 31 may measure a distance from communication device 30 to communication device 40 and/or the mobile device 20. In another example, the measuring device 31 may measure a distance from communication device 30 to a detectable object A.

The communication devices 30, 40 may communicate with the mobile device 20 and/or any other communication device. Communication may include transmission or reception of information, data, images, security codes, or any form of information. For example, distance information may be passed back and forth between the communication devices 30, 40, the mobile device 20, or any combination thereof. In another example, the communication devices 30, 40 communicate with a processing system. The processing system may remotely process information for the communication devices 30, 40.

As shown in FIG. 2, the mobile device 20 may include a measuring device 21, computing system 22, and display device 23. Additional, different, or fewer components may be provided. For example, the mobile device 20 may include multiple display devices 23. In another example, the mobile device 20 may not include a computing system 21 and/or display device 23. The processing and display may be performed remotely.

The mobile device 20 is a cellular telephone, personal digital assistant (PDA), laptop computer, personal computer, network node, network endpoint, or other communication device. The mobile device 20 may be mobile or stationary. For example, the mobile device may be docked. In another example, the mobile device may be at a fixed position during operation. The mobile device may be moved relative to the other communication devices, such as before, during, and/or after operation. For example, the mobile device 20 may be a personal cellular telephone, which is independent of communication devices 30, 40. The mobile device 20 may be fixed relative to communication devices 30, 40 during operation. Following operation, the mobile device 20 may again move independently of the communication devices 30, 40.

The mobile device 20 may be disposed in the same or different planes than the communication devices 30, 40. For example, the mobile device 20 and communication devices 30, 40 may be placed on a table top to generate a two-dimensional multi-touch detection area. In another example, the mobile device 20 and communication devices 30, 40 are disposed in the same plane; however, another communication device is disposed in another plane to generate a three-dimensional multi-touch detection area.

The measuring device 21 is an infrared transceiver, ultrasonic transceiver, sensor bar, array of sensors, positioning system, or other now known or later developed device for measuring a distance. The measuring device 21 measures distance. For example, an infrared transceiver may include infrared emitting and receiving elements. Infrared light may be emitted from the measuring device 21 toward a detectable object. The infrared light may reflect from the detectable object and return toward the measuring device 21. The infrared receiving element may receive the reflected infrared light. The time from emission to reception may be used to calculate the distance from the measuring device 21 to the detectable object. In another example, the measuring device 21 uses ultrasonic waves.

Figure 4:
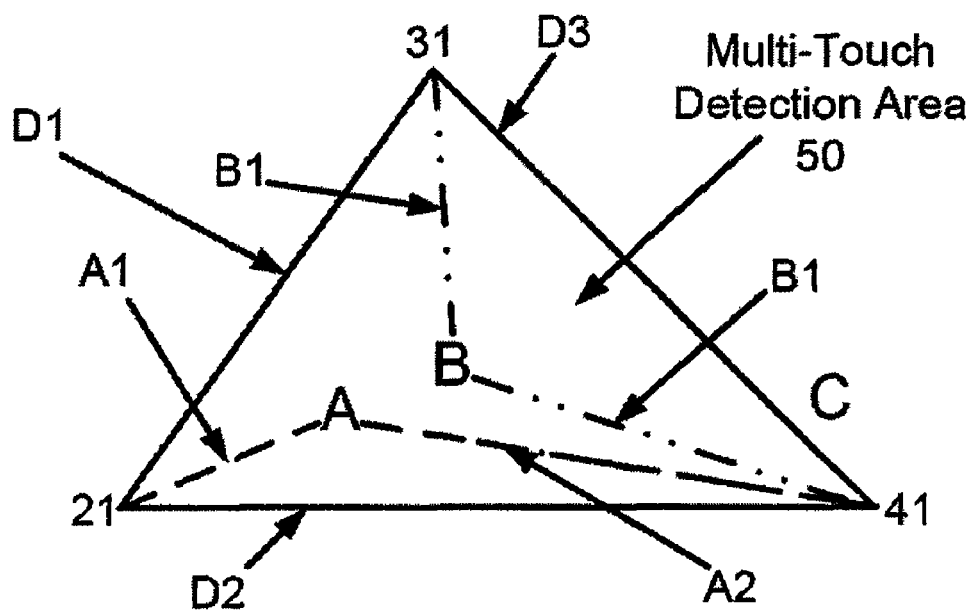
FIG. 4 illustrates another embodiment of a multi-touch detection area.

The measuring devices 21, 31, 41 may be disposed such that a multi-touch detection area 50 is generated between the measuring devices 21, 31, 41. As discussed below, the detection area 50 is a defined region. The detection area 50 may or may not correspond to a detectable region 60. The detectable region 60 is the region that one or more of the measuring devices 21, 31, 41 are able to detect objects A, B, C. The measuring devices 21, 31, 41 may measure the distances to detectable objects inside or outside the detection area 50. For example, as shown in FIG. 4, the mobile device 20 may determine a distance from the measuring device 21 to the detectable object C, which is outside the detection area 50.

The multi-touch detection area 50 may change shape or size. For example, the shape or size of the detection area 50 may be changed by a computing system 21. In another example, the shape or size of the detection area 50 may be changed as the measuring devices 21, 31, 41 are moved relative to each other and/or additional measuring devices are used. Adding a fourth measuring device to the system 10 in FIG. 1 may change the shape of the detection area 50 from triangular to rectangular. In another example, moving the mobile device 20 away from communication device 40 may enlarge the detection area 50 and generate a scalene detection area 50. In another example, a fourth measuring device may be added in a plane that is above or below a plane including the measuring devices 21, 31, 41. The fourth measuring device may be used to generate a three-dimensional (3D) detection area 50. The measuring devices 21, 31, 41 may be moved, adjusted, or tilted to obtain a desired detection area 50.

The computing system 22 may include a processor and memory. Additional, different, or fewer components may be provided. For example, a communication device may be provided. The communication device may be used to communicate with other devices or components. The communication device may be a wire, wireless transmitter/receiver, router, or other device for providing or receiving communication.

The computing system 22 is a general processing system, network processing system, remote processing system, server, personal computing system, or other now known or later developed computing system. The computing system 21 provides automated assistance for measuring, determining, or communicating distance measurements.

The processor 24 is a general processor, digital signal processor, application specific integrated circuit, field programmable gate array, analog circuit, digital circuit, combinations thereof, or other now known or later developed processor. The processor may be a single device or a combination of devices, such as associated with a network or distributed processing. Any of various processing strategies may be used, such as multi-processing, multi-tasking, parallel processing, remote processing or the like. Processing may be local, as opposed to remotely. The processor is responsive to instructions stored as part of software, hardware, integrated circuits, firmware, micro-code or the like.

The processor 24 may perform a pairing protocol. The pairing protocol provides a way to connect and exchange information between devices, such as the mobile device 20, first communication device 30, and/or second communication device 40. The pairing protocol may authenticate the other devices. For example, the pairing protocol may be a handshaking process in Bluetooth communications. The pairing protocol may be used to transmit secured communications.

The processor 24 may cause the measuring device 21 to measure a distance between the mobile device 20 and communication devices 30, 40. For example, the processor may instruct the measuring device to obtain a distance D1 from the mobile device 20 to the first communication device 30 and to obtain a distance D2 from mobile device 20 to the second communication device 40. The distance may be obtained in combination with or independent of a processing application. For example, the measuring device 21 may be an infrared measuring device. The processor may cause the measuring device 21 to transmit and receive infrared light. The processor may determine the amount of time between transmit and receive and determine the distance as a function of the amount of time.

The processor 24 may cause measuring devices 31, 41 to measure a distance. For example, the processor may instruct measuring device 41 to obtain a distance D2 from the second communication device 40 to the mobile device 20 and to obtain a distance D3 from the second communication device 40 to the first communication device 30. In another example, the processor may instruct measuring device 31 to obtain a distance D1 from the first communication device 30 to the mobile device 20 and to obtain a distance D3 from the first communication device 30 to the second communication device 40. The distance may be obtained in combination with or independent of a processing application.

In one embodiment, the communication devices 30, 40 may include processors or communicate with a processing system. The processors may instruct the measuring devices 31, 41 to obtain the distances D1, D2, D3. The instruction may be independent of the mobile device 20 or instructions received from the mobile device. The distances D1, D2, D3 may be communicated to the mobile device 20 or other communication device for system 10 processing.

The processor 24 may calibrate distances D1, D2, D3 measured by the measuring devices 21, 31, 41. Calibration may include comparing the measured distances D1, D2, D3 from the different measuring devices 21, 31, 41. For example, the distance D1 obtained by the mobile device 20 may be compared to the distance D1 obtained by the first communication device 30. A difference between the distance measurements is determined. A modification factor may be generated based on the distance difference. The modification factor is used for modifying past, present, and/or future measurements. The distances D1, D2, D3 may be modified with the modification factor.

The processor 24 may automatically calibrate distances continuously, periodically, and/or as a rule. For example, distances may be calibrated before a distance to a detectable object is obtained. In another example, distances are calibrated at intervals, such as once a second, minute, or hour. In yet another example, distances are calibrated when the measuring device 20, first communication device 30, second communication device 40, or a combination thereof are moved. In yet another example, the distances are calibrated when a new reference point, communication device, mobile device, measuring device or other communication device joins the system 10.

Figure 3:
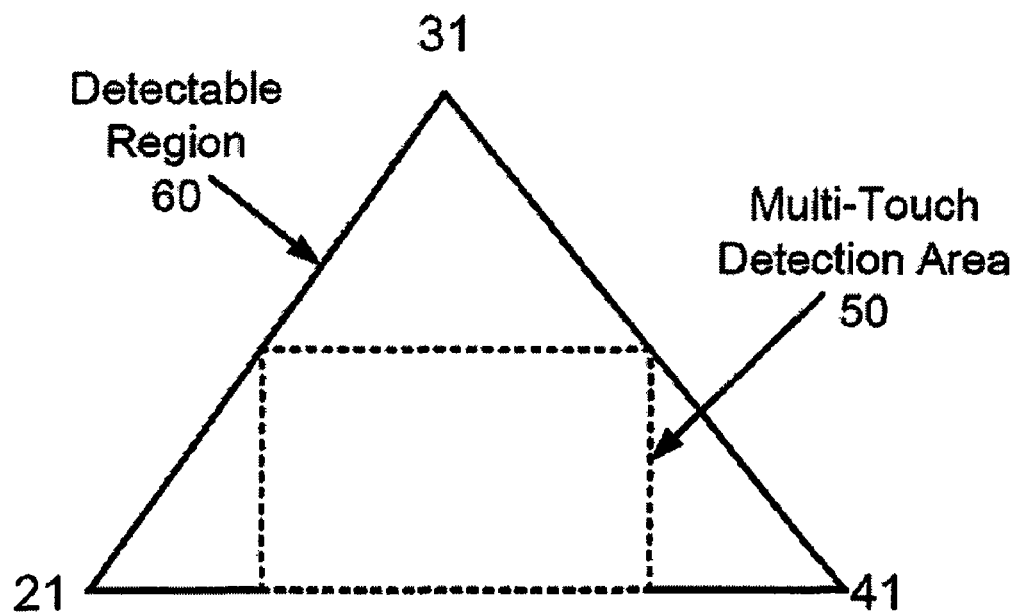
FIG. 3 illustrates one embodiment of a multi-touch detection area.

The processor 24 may define the detection area 50 using one or more detection criteria. For example, detection criteria may be used to define the detection area 50 in an area between the measuring devices 21, 31, 41 that is detectable by one, some, or all of the measuring devices 21, 31, 41. In another example, detection criteria may define a multi-touch detection area where two or more detectable objects are detectable. In another example, as shown in FIG. 3, detection criteria may be used to define the shape, size, or detectable area of the detection area 50. The detection criteria may relate the detection area 50 to an associated display. The detection area 50 may be scaled. In yet another example, detection criteria may be used to define the detection area 50 in an area where the strength of detection satisfies a threshold value, such as where detection is strongest. In yet another example, a detection criteria may be manually set, such that a user may define the detection area 50.

As shown in FIGS. 1 and 3, the multi-touch detection area 50 may or may not be the system's detectable region 60. The detectable region 60 is an area where one, some, or all of the measuring devices 21, 31, 41 detect and determine a distance to one or more detectable objects. For example, as shown in FIG. 4, the measuring device 21 may be able to determine a distance to detectable object C, even though object C is outside the detection area 50. The multi-touch detection area 50 is an area that is used for controlling an application, program, or display. For example, detectable objects A, B, which are disposed within the detection area 50, may be used to rotate an image displayed on the display device 23.

The multi-touch detection area 50 may be visually defined. For example, a light beam may be shown onto a surface. The light beam may visually represent one or more borders of the detection area 50. In another example, the display device 23 may project an image onto a surface. The image may define the borders of the detection area 50. In yet another example, the detection area 50 is not visually represented.

The processor 24 may cause one or more of the measuring devices 21, 31, 41 to detect the presence of one or more detectable objects A, B, C. The presence of one or more detectable objects A, B, C may be detected when the detectable objects are in the detectable region 60 and/or in the multi-touch detection area 50. The objects may be detected in the same plane or a different plane than one or more of the measuring devices 21, 31, 41. For example, when the measuring devices 21, 31, 41 are disposed on a tabletop, a detectable object that approaches or touches the tabletop may be detected.

The processor 24 may cause one or more of the measuring devices 21, 31, 41 to determine a distance to a detectable object A, B, C. For example, as shown in FIG. 4, the processor 24 may instruct measuring device 21 of the mobile device 20 to determine a distance A1 from the mobile device 20 to detectable object A. The processor 24 may cause the measuring device 41 to determine a distance A2 from the second communication device 40 to the detectable object A. In another example, the processor 24 may instruct measuring device 41 to determine a distance B1 from the second communication device 40 to the detectable object B. The processor 24 may cause the measuring device 31 to determine a distance B2 from the first communication device 40 to the detectable object B. In another example, the processor 24

The processor 24 may define a two-dimensional (2D) or three-dimensional (3D) detection coordinate system. The detection coordinate system may be defined in the detection area 50, detectable region 60, and/or other areas. The detection coordinate system may be a Cartesian coordinate system, polar coordinate system, rectangular coordinate system, or other now known or later developed coordinate system. The detection coordinate system may be associated with a display device 23. The coordinates of the detection coordinate system may relate to the coordinates of the display device 23. The detected coordinates may be the same, scaled, a factor of, or otherwise related to displayed coordinates. For example, the 2D Cartesian detection coordinates (1,1) may relate to displayed coordinates (1,1), even if the detection area 50 is not the same shape, size, or quality of the display device 23.

The processor 24 may calculate a set of coordinates (e.g., a point within a coordinate system) for one or more detectable objects A, B within the detection area 50. 2D or 3D coordinates may be determined. The processor 24 may use triangulation to determine (calculate) the coordinates of the detectable objects A, B, C. Triangulation may be used to find the coordinates and/or a distance to an object. Triangulation is based on the distances D1, D2, D3 between the measuring devices 21, 31, 41 and the distances A1, A2, B1, B2 to the objects A, B.

Figure 5:
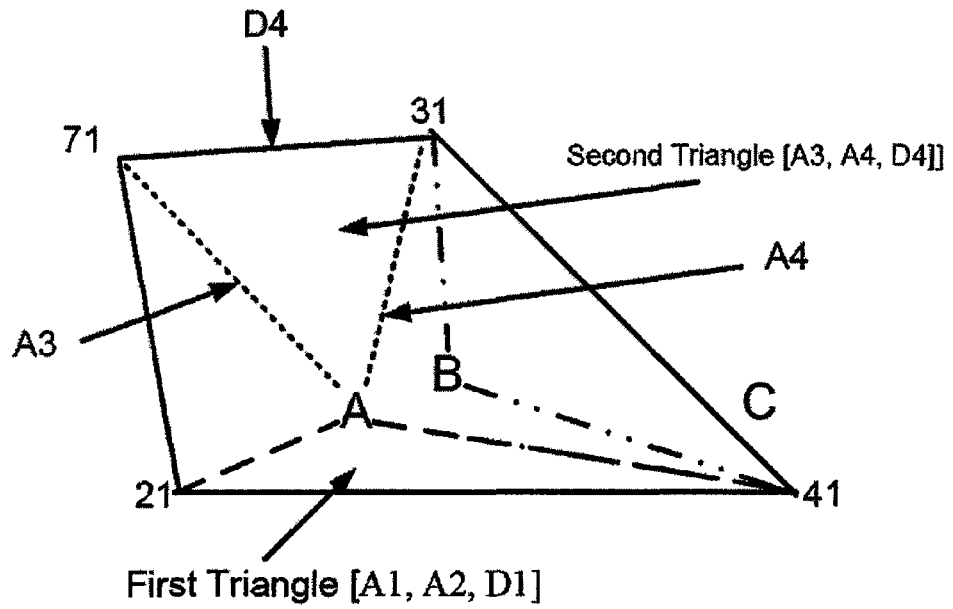
FIG. 5 illustrates yet another embodiment of a multi-touch detection area.

As shown in FIG. 4, the processor 24 may define one or more triangles within the detection area 50. Since triangulation is based on the law of sines, the defined triangles may be used to determine a set of coordinates (e.g., a point) for each of the detectable objects A, B, C. For example, as shown in FIG. 5, a first triangle [A1, A2, D2] may be defined by distances A1, A2, and D1. The first triangle [A1, A2, D2] may be used to determine a set of coordinates for the detectable object A.

In one embodiment, the processor 24 may calibrate a set of coordinates determined using a first triangle with a set of coordinates using a second triangle. The addition of measuring devices within the system 10 may increase the number of triangles that may be defined. For example, as shown in FIG. 5, a second triangle [A3, A4, D4] may be defined by the distances A3, A4, and D4. The second triangle [A3, A4, D4] may be used to determine a set of coordinates for the detectable object A. The two sets of coordinates for detectable object A may be calibrated.

The processor 24 may automatically determine the sets of coordinates for the detectable objects. The processor 24 may determine the sets of coordinates continuously, periodically, or as a rule. For example, the processor 24 may provide real-time determination of the sets of coordinates. The processor 24 may update the display device 23 in accordance with the determined sets of coordinates.

The processor 24 may associate the presence of detectable objects with different functions. For example, a detectable object that is disposed at a set of coordinates (a point) within the detection area 50, removed from the detection area 50, and then disposed at the same set of coordinates (or similar coordinates) may relate to a "tapping function." The tapping function may be used to select or control images. In another example, a detectable object disposed at a first set of coordinates with a second detectable object changing position (e.g., a second set of coordinates) with respect to the first detectable object may relate to a zooming or rotating function.

The processor 24 may determine if the detectable object A, B, C is within the detection area 50. The processor may compare the coordinates of the detectable object A, B, C to the coordinates that define the detection area 50. For example, the processor 24 may determine the coordinates for detectable object C. The coordinates of detectable object C may be compared to the coordinates of the multi-touch detection area 50. If the coordinates are within the detection area 50, the processor may continue to process the coordinates, such as determining a function associated with the coordinates. If the coordinates are not within the detection area 50, the processor 24 may ignore or cause a message to be displayed. The message may include a message that the detectable object is outside the detection area 50.

The processor 24 may control an application, program, network, computer, or display based on one or more sets of coordinates for one or more objects A, B that are within the detection area 50. For example, the processor 24 may use a first set of coordinates and second set of coordinates to provide multi-touch service.

The processor 24 may cause an image to be displayed on the display device 23. The image may be an application image, digital image, video image, or now known or later developed image. For example, an application image may relate to an application being processed by the processor 24. A user may control the application by viewing the application image and selecting or instructing different functions. A detectable image placed at a designated set of detection coordinates may relate to the selection of a function.

The memory 25 is a processor readable storage media. The computer readable storage media may include various types of volatile and non-volatile storage media, including but not limited to random access memory, read-only memory, programmable read-only memory, electrically programmable read-only memory, electrically erasable read-only memory, flash memory, magnetic tape or disk, optical media and the like. The memory 25 may be a single device or a combination of devices. The memory 25 may be adjacent to, part of, networked with and/or remote from the processor 24.

The memory 25 may be a computer readable storage media having stored therein data representing instructions executable by the programmed processor 24 for generating a multi-touch surface. The memory 32 stores instructions for the processor 24. The processor 24 is programmed with and executes the instructions. The functions, acts, methods or tasks illustrated in the figures or described herein are performed by the programmed processor 24 executing the instructions stored in the memory 25. The functions, acts, methods or tasks are independent of the particular type of instructions set, storage media, processor or processing strategy and may be performed by software, hardware, integrated circuits, firm ware, micro-code and the like, operating alone or in combination. The instructions are for implementing the processes, techniques, methods, or acts described herein.

The display device 23 is a pico projector, accessory projector, CRT, monitor, flat panel, a general display, LCD, general projector, printer or other now known or later developed device for outputting determined information. The display device 23 may visually represent multi-detection area 50. The display device 23 may display one or more images. For example, the display device 23 may display 2D images, projections, or representations. In another example, the display device 23 may display 3D images, projections, or representations.

In one embodiment, the visual representation may be displayed on the detection area 50 or on another area. For example, the display device 23 may display an application image, such as a graphical interface, onto a tabletop supporting the mobile device 20 and communication devices 30, 40. In another example, the display device 23 may display an application image on a wall or other surface disposed within a projection range of the display device 23.

Figure 6:
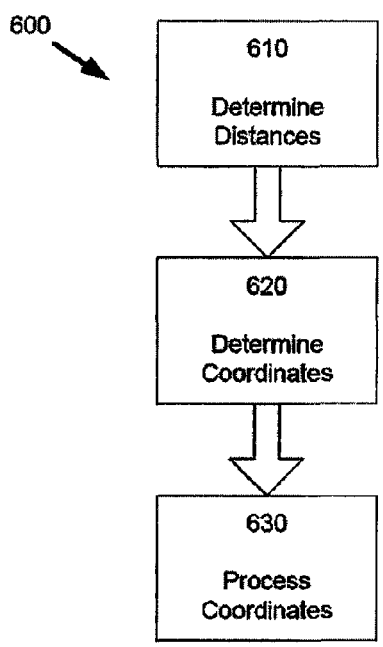
FIG. 6 is a flowchart illustrating one embodiment of a method for generating a multi-touch detection area.

FIG. 6 shows a method 600 for generating a multi-touch detection area. The method 600 is implemented using the system 10 of FIG. 1 or a different system. The acts may be performed in the order shown or a different order. For example, act 630 does not need to be performed. The acts may be performed automatically, manually, or the combination thereof.

The method 600 may include determining distances to first and second communication devices [act 610]; determining coordinates of a detectable object [act 620]; and processing the coordinates [act 630]. Additional, different, or fewer acts may be provided. For example, method 600 may include configuring a mobile device for generating a multi-touch detection area. Configuration may include disposing the mobile device in relation to a first and second communication devices; establishing a pairing protocol with the first and second communication devices; and focusing a display device.

In act 610, the distances to first and second communication devices are determined. Determining the distances may include measuring the distances, reading distance information from memory, receiving distance information from one or more communication devices, estimating the distances, or any technique for determining distances. For example, a mobile device may use a measuring device to measure the distance from the mobile device to a first communication device, and use the measuring device to measure the distance from the mobile device to the second communication device.

Act 610 may include receiving distance information from the first and second communication devices; calibrating the determined distances and received distances; and defining a detection area. Additional, different, or fewer acts may be performed during act 610.

Receiving distance information may include instructing the first and second communication devices to measure the distance from the communication device to the mobile device and/or other communication devices, and transmitting the distance information to mobile device. The mobile device may transmit an instruction to the first and second communication devices. The instruction may cause the first and second communication devices to measure a distance. For example, the instruction may cause the first communication device to measure a distance from the first communication device to the mobile device and/or the second communication device. In another example, the instruction may cause the second communication device to measure a distance from the second communication device to the mobile device and/or the first communication device.

The first and/or second communication devices may automatically measure distances. For example, the first and second communication devices may measure distances without receiving instructions from the mobile device. The first and second communication devices may measure distances as a result of an application being processed on the first and/or second communication devices, which is independent of an application being processed on the mobile device; an instruction from a communication device, such as a unified processing system; or any instruction received at or generated by one or both of the communication devices.

The measured distances may be transmitted to the mobile device. The distances may be identified in distance information. Once determined, the first and/or second communication devices may transmit the determined distances to the mobile device. The distances may be transmitted using an established protocol. The distances may be transmitted directly or indirectly from one or both of the communication devices. For example, the second communication device may communicate the distances measured by the second communication device to the first communication device. The first communication device may transmit the measured distances, from the first and second communication devices, to the mobile device. In another example, the first and second communication devices may transmit the measured distances to a remote processing system. The remote processing system may transmit the measured distances to the mobile device.

The distance information may be received from the first and/or second communication devices. The distance information may be stored in memory or processed.

The distances between the mobile device and communication devices may be calibrated. Calibrating the distances may include calibrating the distances determined by the mobile device and distances received from the communication devices. Calibration may include automatic comparison of distance measurements. For example, a distance measurement that was measured by the mobile device may be compared to a distance measurement that was measured by the first communication device. The compared distance measurements may relate to the same distance, for example, the distance between the mobile device and first communication device.

The multi-touch detection area may be defined. The multi-touch detection area may be defined using one or more detection criteria or parameters. Definition of the multi-touch detection area may include establishing a coordinate system. The coordinate system may be used to define a position of a detectable object relative to the mobile device, first communication device, and/or second communication device. The defined coordinate system may be associated with or relate to a coordinate system of the display device. For example, coordinates of the multi-touch detection area may be used to define coordinates of the display device.

In act 620, the coordinates of a detectable object are determined. Act 620 may include determining a distance from a mobile device and/or communication device to a detectable object; adjusting the distances to the detectable object; and using triangulation to determine the coordinates of a detectable object. Additional, different, or fewer acts may be performed. For example, the coordinates of two or more detectable objects may be determined.

A distance from a mobile device and/or communication device to a detectable object may be determined. Determination may include measuring. For example, the mobile device, first communication device, and/or second communication device may measure a distance from the respective location to the detectable object.

The distances to the detectable object may be adjusted. Based on the calibration of the distances in act 610, the distances to the detectable object may be adjusted, such that differences in the measuring devices are considered. The distances may be adjusted to compensate for these differences.

The coordinates of a detectable object may be determined. Determining the coordinates may include using triangulation. Triangulation may use the determined distances, such as the distances between measuring devices and distances to the detectable object, to determine the location or coordinates of the detectable object. Triangulation may include using the law of sines or cosines to calculate the coordinates. The coordinates of the detectable object are determined as a function of the distances between measuring devices and distances to the detectable object.

The coordinates of a plurality of detectable objects may be determined. The coordinates may be determined simultaneously. For example, the coordinates of two detectable objects disposed in the multi-touch area at the same time may be determined.

In act 630, the coordinates of the detectable object may be processed. Act 630 may include controlling an application displayed on a display device. For example, an application image may be displayed using the display device. The application image may be projected onto a surface. The surface may be the same or different surface than a surface directly or indirectly supporting the mobile device and/or communication devices. For example, the application image may be displayed onto a multi-touch detection area or onto a wall.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method comprising:
   determining, using a processor, a detection area defined by a distance from a first mobile device to a second mobile device, a distance from the second mobile device to a third mobile device, and a distance from the third mobile device to the first mobile device, wherein the first mobile device, the second mobile device, and the third mobile device are configured to communicate on a wireless network;
   determining a distance from a detectable object disposed in the detection area to at least two of the first mobile device, the second mobile device, or the third mobile device;
   determining, using the processor, a set of coordinates of the detectable object disposed in the detection area using a triangulation process that utilizes the distance from the detectable object to the at least two of the first mobile device, the second mobile device or the third mobile device; and
   projecting a display that includes a displayed coordinate system, such that the set of coordinates corresponds to a displayed set of coordinates on the displayed coordinate system.

2. The method as claimed in claim 1, further comprising:
   determining a second set of coordinates of a second detectable object disposed in the detection area using the triangulation process.

3. The method as claimed in claim 1, wherein each of the first mobile device, the second mobile device, and the third mobile device includes at least one measuring device configured to measure distances.

4. The method as claimed in claim 2, further comprising:
   calibrating distances measured by the first mobile device, the second mobile device, and the third mobile device.

5. A tangible machine readable medium comprising machine executable instructions that when executed, are configured to:
   define a detection area using a distance from a first mobile device to a second mobile device, a distance from the second mobile device to a third mobile device, and a distance from the third mobile device to the first mobile device, wherein the first mobile device, the second mobile device, and the third mobile device are located in a plane defining the detection area;
   determine a distance from a detectable object disposed in the detection area to at least two of the first mobile device, the second mobile device, or the third mobile device;
   determine a set of coordinates of the detectable object disposed in the detection area using a triangulation process that utilizes the distance from the detectable object to the at least two of the first mobile device, the second mobile device or the third mobile device; and
   project a display that includes a displayed coordinate system, such that the set of coordinates corresponds to a displayed set of coordinates on the displayed coordinate system.

6. The tangible machine readable medium of claim 5, further comprising instructions to:
   determine a second set of coordinates of a second detectable object disposed in the detection area using the triangulation process.

7. The tangible machine readable medium of claim 5, wherein each of the first mobile device, the second mobile device, and the third mobile device includes at least one measuring device configured to measure distances.

8. The tangible machine readable medium of claim 5, further comprising instructions to:
   calibrate distances measured by the first mobile device, the second mobile device, and the third mobile device.

* * * * *